(12) United States Patent
Bayyouk

(10) Patent No.: US 11,566,748 B2
(45) Date of Patent: Jan. 31, 2023

(54) LUBRICATION SYSTEM FOR A FRAC PUMP

(71) Applicant: SPM Oil & Gas Inc., Fort Worth, TX (US)

(72) Inventor: Jacob Bayyouk, Richardson, TX (US)

(73) Assignee: SPM Oil & Gas Inc., Fort Worth, TX (US)

(*) Notice: Subject to any disclaimer, the term of this patent is extended or adjusted under 35 U.S.C. 154(b) by 333 days.

(21) Appl. No.: 16/638,717

(22) PCT Filed: Aug. 31, 2018

(86) PCT No.: PCT/US2018/049020
§ 371 (c)(1),
(2) Date: Feb. 12, 2020

(87) PCT Pub. No.: WO2019/046680
PCT Pub. Date: Mar. 7, 2019

(65) Prior Publication Data
US 2020/0208776 A1    Jul. 2, 2020

Related U.S. Application Data

(60) Provisional application No. 62/553,243, filed on Sep. 1, 2017.

(51) Int. Cl.
*F16N 7/38* (2006.01)
*F04B 53/18* (2006.01)
(Continued)

(52) U.S. Cl.
CPC ......... *F16N 7/38* (2013.01); *F01M 2001/126* (2013.01); *F01M 2011/0083* (2013.01);
(Continued)

(58) Field of Classification Search
CPC . F16N 7/38; F16N 39/02; F16N 39/04; F16N 39/06; F04B 53/18; F04B 39/0207; F01M 2001/126; F01M 2011/0083
See application file for complete search history.

(56) References Cited

U.S. PATENT DOCUMENTS 3,286,791 A * 11/1966 Cofer ..................... F16N 39/00
184/104.1
4,095,644 A *  6/1978 Huff ..................... F16H 57/0412
184/6.1
(Continued)

FOREIGN PATENT DOCUMENTS

CN      204901305 U    12/2015
KR      10-1133253 B1   4/2012

OTHER PUBLICATIONS

International Search Report and Written Opinion of PCT/US2018/049020 dated Nov. 21, 2018.

*Primary Examiner* — Minh Truong

(57) ABSTRACT

A lubrication system for a frac pump includes a lubrication system housing, a lubricant tank held by the lubrication system housing, a heating device held by the lubrication system housing, a cooling device held by the lubrication system housing, and a filtration device held by the lubrication system housing. The lubrication system housing is configured to be at least one of mounted to a frac pump housing of the frac pump or held within the frac pump housing.

13 Claims, 7 Drawing Sheets

(51) Int. Cl.
    *F16N 39/02*     (2006.01)
    *F16N 39/04*     (2006.01)
    *F16N 39/06*     (2006.01)
    *F01M 1/12*     (2006.01)
    *F01M 11/00*     (2006.01)

(52) U.S. Cl.
    CPC .............. *F04B 53/18* (2013.01); *F16N 39/02* (2013.01); *F16N 39/04* (2013.01); *F16N 39/06* (2013.01)

(56) References Cited

U.S. PATENT DOCUMENTS

| | | | | |
|---|---|---|---|---|
| 4,553,298 | A * | 11/1985 | Grable | F04B 9/02 29/559 |
| 5,318,152 | A | 6/1994 | Ehlert | |
| 10,309,518 | B2 * | 6/2019 | Koponen | F16H 57/0434 |
| 11,209,124 | B2 * | 12/2021 | Wagner | F04B 23/02 |
| 2006/0207659 | A1 * | 9/2006 | Shaefer | F04D 13/066 137/355.2 |
| 2010/0056315 | A1 * | 3/2010 | Scholte-Wassink | F03D 80/50 700/282 |
| 2010/0089340 | A1 * | 4/2010 | Givens | F02B 63/04 290/1 A |
| 2011/0204633 | A1 * | 8/2011 | Takayanagi | F16N 39/02 290/44 |
| 2013/0251556 | A1 * | 9/2013 | DePaz | F16N 7/40 417/372 |
| 2015/0337946 | A1 | 11/2015 | Koponen et al. | |
| 2016/0177945 | A1 | 6/2016 | Byrne et al. | |
| 2016/0237757 | A1 | 8/2016 | Stegemoeller | |
| 2018/0328157 | A1 * | 11/2018 | Bishop | E21B 43/26 |

\* cited by examiner

LUBRICATION SYSTEM FOR A FRAC PUMP

CROSS REFERENCE TO RELATED APPLICATION

This application is a National Stage Entry of, claims priority to, and claims the benefit of International Patent Cooperation Treaty (PCT) Application Serial No. PCT/US2018/049020 entitled "LUBRICATION SYSTEM FOR A FRAC PUMP" filed on 31 Aug. 2018, which claims priority to and the benefit of U.S. Provisional Patent Application Ser. No. 62/553,243, filed on Sep. 1, 2017 entitled, "STAND-ALONE INTEGRATED LUBRICATION SYSTEM," which are incorporated herein by reference in their entireties for any purpose.

TECHNICAL FIELD

This disclosure relates to frac pumps of hydraulic fracturing systems, and in particular, to lubrication systems for frac pumps.

BACKGROUND OF THE DISCLOSURE

In oilfield operations, frac pumps are used for different fracturing operations such as fracturing subterranean formations to drill for oil or natural gas, cementing a wellbore, or treating the wellbore and/or formation. A frac pump typically includes a power end having an engine or motor that drives a plunger that pumps fluid through a fluid end of the frac pump. The engine or motor of the power end requires lubrication during operation of the frac pump.

Conventional lubrication systems for frac pumps are open systems that are typically assembled piecemeal and share in the infrastructure of the site of the fracturing operation. Accordingly, conventional frac pump lubrication systems can suffer from a variety of disadvantages, for example difficult and/or time-consuming installation, relatively long lubrication lines, relatively poor lubricant quality caused by moisture ingress, contamination of the lubricant, oxidation of the lubricant, inadequate heating and/or cooling, and/or poor filtration of the lubricant, etc. The disadvantages of conventional frac pump lubrication systems can increase the costs of fracturing operations. For example, the relatively poor lubricant quality can cause the frac pump to malfunction and/or fail, which can necessitate costly downtime for repairs or replacement of the frac pump.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

In a first aspect, a lubrication system for a frac pump includes a lubrication system housing and a lubricant tank held by the lubrication system housing and configured to hold a lubricant. A heating device is held by the lubrication system housing. The heating device is fluidly connected to the lubricant tank such that the heating device is configured to heat the lubricant. A cooling device is held by the lubrication system housing. The cooling device is fluidly connected to the lubricant tank such that the cooling device is configured to cool the lubricant. A filtration device is held by the lubrication system housing. The filtration device is fluidly connected to the lubricant tank such that the filtration device is configured to filter the lubricant. The lubrication system housing is configured to be at least one of mounted to a frac pump housing of the frac pump or held within the frac pump housing.

In some examples, the lubrication system housing, the lubricant tank, the heating device, the cooling device, and the filtration device are contained within the frac pump housing.

In some examples, the lubrication system housing is mounted to an exterior of the frac pump housing such that the lubricant tank, the heating device, the cooling device, and the filtration device are held on the exterior of the frac pump housing.

In one example, the frac pump is configured to be held by a frac pump platform. The lubrication system housing is mounted to the frac pump housing such that the lubricant tank, the heating device, the cooling device, and the filtration device are held on the frac pump platform underneath the frac pump.

In some examples, the lubrication system includes a lubricant pump configured to move lubricant between the lubricant tank, the heating device, the cooling device, the filtration device, and the frac pump.

In some examples, the lubrication system includes a control system configured to monitor and control at least one of a temperature of the lubricant, a pressure of the lubricant, a quality of the lubricant, a flow rate of the lubricant, or operation of a pump of the lubrication system.

In some examples, the lubricant tank includes an outlet fluidly connected to a lubricant circuit of the frac pump and configured to deliver a flow lubricant to the lubricant circuit. The lubricant tank includes an inlet fluidly connected to the lubricant circuit and configured to receive a flow of the lubricant from the lubricant circuit.

In one example, the heating device is at least partially contained within the lubricant tank.

In a second aspect, a frac pump includes a fluid end and a power end operatively connected to the fluid end. The power end includes a power end housing. The frac pump also includes a lubrication system fluidly connected to the power end for delivering a lubricant to the power end. The lubrication system includes a lubrication system housing and a lubricant tank held by the lubrication system housing. The lubrication system includes a heating device held by the lubrication system housing and configured to heat the lubricant. The lubrication system includes a cooling device held by the lubrication system housing and configured to cool the lubricant. The lubrication system includes a filtration device held by the lubrication system housing and configured to filter the lubricant. The lubrication system housing is at least one of mounted to the power end housing of the frac pump or held within the power end housing.

In some examples, the lubrication system housing, the lubricant tank, the heating device, the cooling device, and the filtration device are contained within the power end housing.

In some examples, the lubrication system housing is mounted to an exterior of the power end housing such that the lubricant tank, the heating device, the cooling device, and the filtration device are held on the exterior of the power end housing.

In one example, the frac pump is configured to be held by a frac pump platform. The lubrication system housing is at least one of mounted to the power end housing of the frac pump or held within the power end housing such that the lubricant tank, the heating device, the cooling device, and the filtration device are held on the frac pump platform underneath the frac pump.

In some examples, the lubrication system further includes a lubricant pump configured to move lubricant between the lubricant tank, the heating device, the cooling device, the filtration device, and the frac pump.

In some examples, the lubrication system further includes a control system configured to monitor and control at least one of a temperature of the lubricant, a pressure of the lubricant, a quality of the lubricant, a flow rate of the lubricant, or operation of a pump of the lubrication system.

In one example, the power end includes a lubricant circuit and the lubricant tank includes an outlet fluidly connected to the lubricant circuit and configured to deliver a flow lubricant to the lubricant circuit. The lubricant tank includes an inlet fluidly connected to the lubricant circuit and configured to receive a flow of the lubricant from the lubricant circuit.

In one example, the heating device of the lubrication system is at least partially contained within the lubricant tank.

In a third aspect, a frac pump system includes a platform and a frac pump held on the platform. The frac pump includes a fluid end and a power end operatively connected to the fluid end. A lubrication system is fluidly connected to the power end of the frac pump for supplying the power end with a lubricant. The lubrication system includes a housing, a lubricant tank held by the housing, a heating device held by the housing, a cooling device held by the housing, and a filtration device held by the housing. The housing of the lubrication system is mounted on the platform such that the lubricant tank, the heating device, the cooling device, and the filtration device are held on the platform.

In some examples, the platform includes at least one of a skid, a trailer, a fixture, a frame, or a manifold.

In one example, the housing of the lubrication system is mounted on the platform such that the lubricant tank, the heating device, the cooling device, and the filtration device are held on the platform underneath the frac pump.

In some examples, the housing of the lubrication system is at least one of mounted to the frac pump housing or held within the frac pump.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

The accompanying drawings facilitate an understanding of the various embodiments.

Corresponding reference characters indicate corresponding parts throughout the drawings.

DETAILED DESCRIPTION

Certain embodiments of the disclosure provide a lubrication system for a frac pump that can be: mounted to the housing of the power end portion of the frac pump; contained within the housing of the power end portion of the frac pump; and/or mounted on a platform that holds the frac pump.

Certain embodiments of the disclosure provide a stand-alone lubrication system that can be integrated into a frac pump and/or a platform that holds a frac pump. The lubrication systems of certain embodiments of the disclosure can provide independent and sustainable devices and systems that do not depend on frac truck infrastructure for support. Certain embodiments of the disclosure can provide closed-loop lubrication systems with cooling and heating capabilities and imbedded smart controls. The lubrication systems of certain embodiments described and/or illustrated herein can provide a lubrication system that integrates all lubrication-related components, functions, and control systems (e.g., filtration, heating, cooling, smart controls, etc.) as part of the frac pump system to create a closed-loop device that is capable of standing-alone independent of a frac truck infrastructure.

Certain embodiments of the disclosure can protect and increase the operational life of a frac pump life. The lubrication systems of certain embodiments of the disclosure can reduce the total cost of ownership of a frac pump (e.g., by controlling the oil quality, temperature, and start/stop operations of a lubrication system for a frac pump). The lubrication systems of certain embodiments of the disclosure can reduce the effective foot print of the lubrication system and thereby reduce the size of a frac pump system.

Figure 1:
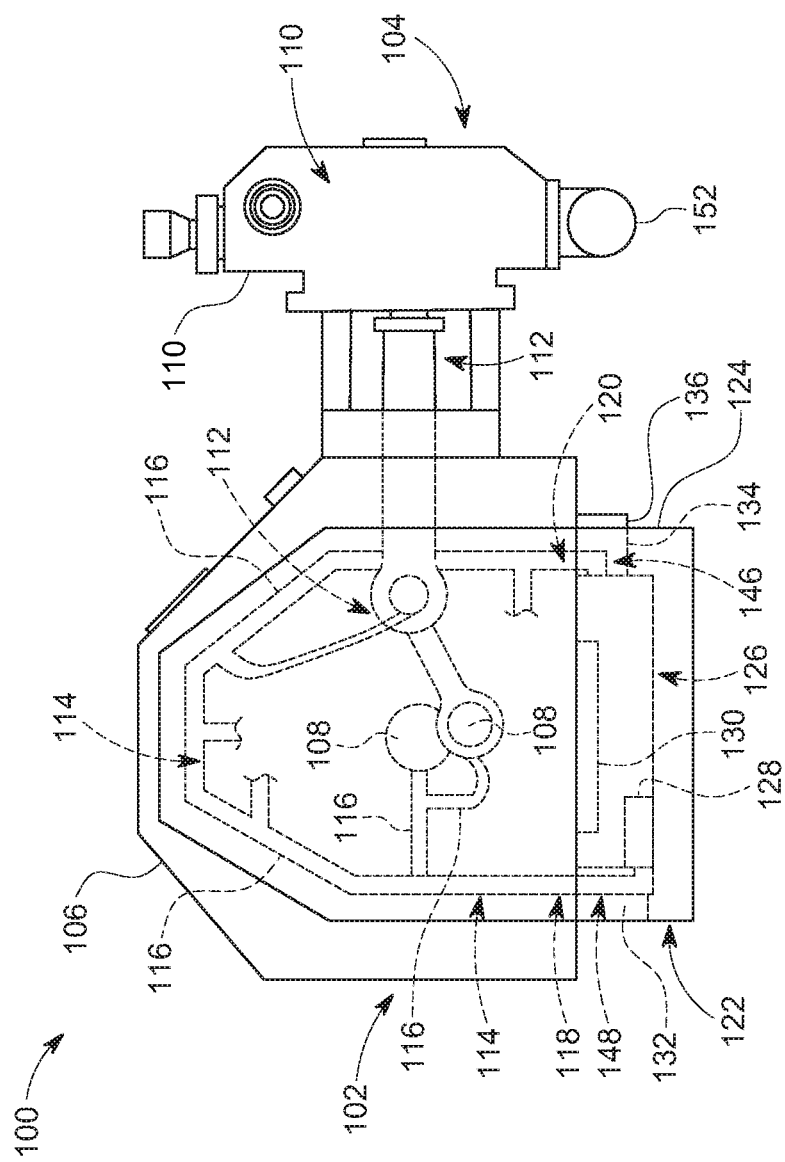
FIG. 1 is a side elevational view of a frac pump according to an exemplary embodiment.

FIG. 1 is a side elevational view of a frac pump 100 according to an exemplary embodiment. The frac pump 100 is used to pump a fluid into a wellbore (not shown) for performing a fracturing operation, for example fracturing a subterranean formation to drill for oil or natural gas, cementing the wellbore, treating the wellbore and/or formation, etc. The frac pump 100 includes a power end portion 102 and a fluid end portion 104 operably coupled to the power end portion 102. The power end portion 102 includes a housing 106 in which a crankshaft 108 is disposed. Rotation of the crankshaft 108 is driven by an engine or motor (not shown) of the power end portion 102. The fluid end portion 104 includes a fluid cylinder 110 (sometimes referred to as a "fluid end block"). In operation, the engine or motor turns the crankshaft 108, which reciprocates a plunger rod assembly 112 between the power end portion 102 and the fluid end portion 104 to thereby pump (i.e., move) fluid through the fluid cylinder 110. The housing 106 of the power end portion 102 may be referred to herein as a "frac pump housing" and a "power end housing".

The power end portion 102 of the frac pump 100 includes a lubricant circuit 114 that includes a plurality of channels 116 that distribute lubricant to various internal components of the power end portion 102. For example, the channels 116 of the lubricant circuit 114 can distribute lubricant to the crankshaft 108, the plunger rod assembly 112, bearings (not shown) of the engine or motor, valves (not shown) of the engine or motor, cam assemblies (not shown) of the engine or motor, a rotor (not shown) of the engine or motor, and/or the like. The lubricant circuit 114 includes an inlet 118 and an outlet 120. The lubricant circuit 114 may include valves (not shown), gates (not shown), flow restrictors (not shown), venturis (not shown), and/or the like that enable the lubricant circuit 114 to distribute lubricant to the various internal components of the power end portion 102 during operation of the frac pump 100.

Figure 2:
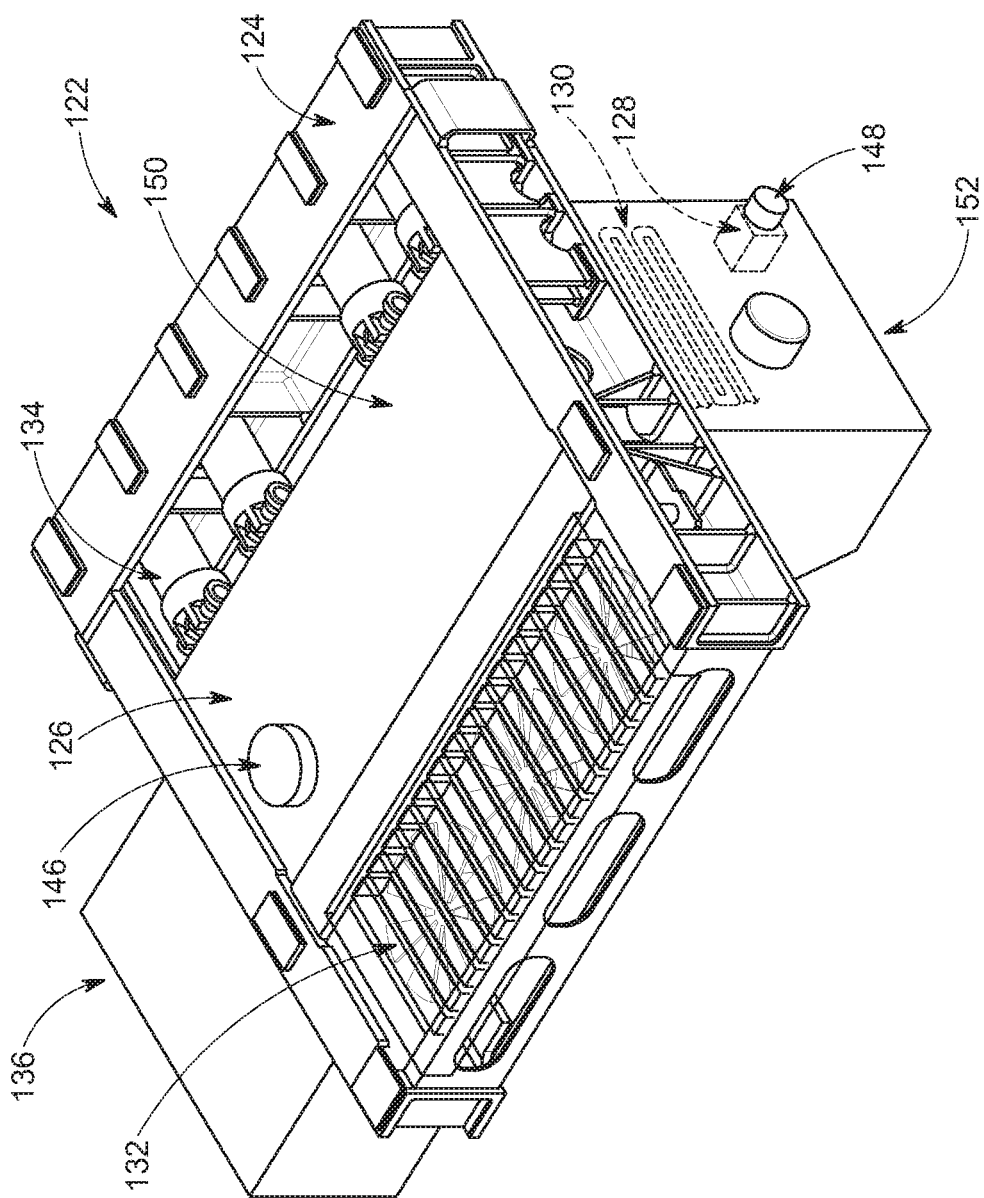
FIG. 2 is a perspective view of a lubrication system for the frac pump shown in FIG. 1 according to an exemplary embodiment.
Figure 3:
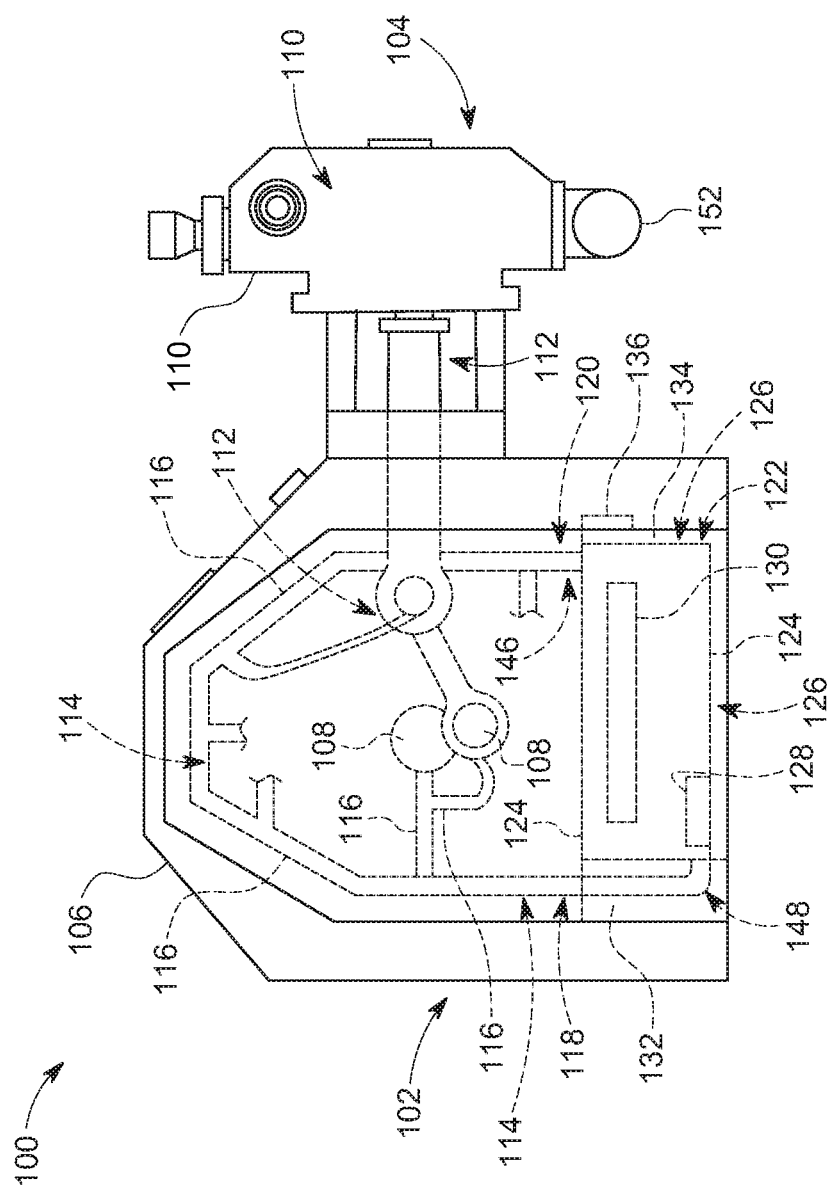
FIG. 3 is a side elevational view of the frac pump shown in FIG. 1 according to another exemplary embodiment.

Referring now to FIG. 2, an exemplary embodiment of a lubrication system 122 for the frac pump 100 (FIGS. 1 and 3). The lubrication system 122 is configured to deliver lubricant to the lubricant circuit 114 (FIGS. 1 and 3) of the frac pump 100 to thereby supply the frac pump 100 with lubricant during operation of the frac pump 100. The lubrication system 122 is also configured to receive lubricant from the lubricant circuit 114 that has been used during operation of the frac pump 100 and recondition the lubricant for reuse by the frac pump 100. In some examples, the lubrication system 122 provides a dry sump system that continuously cycles lubricant into and out of the lubricant circuit 114 during operation of the frac pump 100.

The lubrication system 122 includes a housing 124, a lubricant tank 126, one or more pumps 128, a heating device 130 configured to heat the lubricant, a cooling device 132 configured to cool the lubricant, a filtration device 134 configured to filter the lubricant, and a control system 136. As is shown in FIG. 2, the lubricant tank 126, the heating device 130, the cooling device 134, and the filtration device 124 are each held by the housing 124, whether directly or indirectly. In some examples, the pump 128 is directly or indirectly held by the housing 124. In the exemplary embodiment of the pump 128 shown in FIG. 2, the pump 128 is contained within the lubricant tank 126 such that the pump 128 is indirectly held by the housing 124. In some examples, the control system 136 is directly or indirectly held by the housing 124. In the exemplary embodiment of the control system 136 shown in FIG. 2, the control system 136 is directly held by the housing 124. As will be described below, the housing 124 can be: mounted to the housing 106 (FIGS. 1 and 3) of the power end portion 102 (FIGS. 1 and 3) of the frac pump 100; contained within the housing 106 of the power end portion 102; and/or mounted on a platform (e.g., the platform 138 shown in FIG. 4) that holds the frac pump 100. The housing 124 may be referred to herein as a "lubrication system housing".

The lubricant tank 126 is configured to hold a supply of lubricant. Each of the heating device 130, the cooling device 132, the filtration device 134, and the pump 128 is fluidly connected to the lubricant tank 126 in one or more circuits (e.g., the circuit 140 shown in FIG. 5, the circuit 142 shown in FIG. 6, and the circuit 144 shown in FIG. 7) of the lubrication system 122 through which the lubricant contained within the lubricant tank 126 circulates. In other words, the heating device 130, the cooling device 132, the filtration device 134, and the pump 128 are fluidly connected such that the pump 128 circulates the lubricant contained within the lubricant tank 126 through the circuit(s) between the various components 126, 130, 132, and 134 of the lubrication system 122. The circuit(s) of the lubrication system 122 includes an inlet 146 and an outlet 148. The inlet 146 is fluidly connected to the outlet 120 (FIGS. 1 and 3) of the lubrication circuit 114 (FIGS. 1 and 3) of the frac pump 100 for receiving a flow of the lubricant therefrom. The outlet 148 is fluidly connected to the inlet 118 (FIGS. 1 and 3) of the lubrication circuit 114 of the frac pump 100 for delivering (i.e., supplying) a flow of the lubricant thereto. Although only one is shown, the lubrication system 122 can include any number of the lubricant tanks 126.

The control system 136 is operatively connected to the various components 126, 128, 130, 132, and 134 of the lubrication system 122 for controlling operation of the lubrication system 122. For example, the control system 136 is configured to monitor and control the various components 126, 128, 130, 132, and 134 to thereby control various parameters, operations, and functions lubrication system 122. Examples of the various parameters, operations, and functions monitored and controlled by the control system 136 include but are not limited to, the temperature of the lubricant, the pressure of the lubricant, viscosity of the lubricant, the quality of the lubricant, the flow rate of the lubricant as delivered to the lubrication circuit 114 of the power end portion 102 of the frac pump 100, the operational state (i.e., on, off, speed, etc.) of the pump(s) 128, the operational state (i.e., on, off, temperature, heating capacity, heat exchange rate, etc.) of the heating device 130, the operational state (i.e., on, off, temperature, cooling capacity, cooling exchange rate, etc.) of the cooling device 132, the operational state (i.e., on, off, filtering capacity, filtering capability, filtering rate, remaining filter life, etc.) of the filtering device 134, sending feedback signals to a pump 128, and/or the like. Other examples of monitoring and control capabilities of the control system 136 include selective control of any valves, gates, flow restrictors, baffles, and/or the like of the lubrication system 122, for example to selectively control the flow of lubricant into and/or out of various circuits of the lubrication system 122.

Referring again to FIG. 1, in some examples the lubrication system 122 is mounted to the housing 106 of the power end portion 102 of the frac pump 100. More particularly, the embodiment of FIG. 1 illustrates the housing 124 of the lubrication system 122 mounted to an exterior of the housing 106 of the power end portion 102 of the frac pump 100. As can be seen in FIG. 1, the housing 124 holds the lubricant tank 126, the pump 128, the heating device 130, the cooling device 132, the filtration device 134, and the control system 136 such that the lubricant tank 126, the pump 128, the heating device 130, the cooling device 132, the filtration device 134, and the control system 136 are held on the exterior of the housing 106. The outlet 148 of the lubrication system 122 is fluidly connected to the inlet 118 of the lubricant circuit 114 of the power end portion 102. The inlet 146 of the lubrication system 122 is fluidly connected to the outlet 120 of the lubricant circuit 114 of the power end portion 102. Accordingly, the lubrication system 122 is operatively connected to the lubricant circuit 114 of the power end portion 102 for supplying the lubricant circuit 114 with lubricant during operation of the frac pump 100.

In some examples, the housing 124 of the lubrication system 122 is permanently mounted to the housing 106 of the power end portion 102 (e.g., by welding, etc.), while in other examples the housing 124 is removably connected to the housing 106 (e.g., using fasteners that are selectively removable, etc.). Similarly, the inlet 146 and the outlet 148 of the lubrication system 122 can be removably connected in fluid communication with the respective outlet 120 and inlet 118 of the lubricant circuit 114 of the power end portion 102. In other examples, the inlet 146 and the outlet 148 of the lubrication system 122 are permanently connected in fluid communication with the respective outlet 120 and inlet 118 of the lubricant circuit 114 of the power end portion 102. In other words, the inlet 146 and outlet 148 of the lubrication system 122 can be hardwired in fluid communication with the respective outlet 120 and inlet 118 of the lubricant circuit 114.

Although shown as being mounted to a bottom portion 154 of the housing 106 of the power end portion 102, additionally or alternatively the lubrication system 122 can be mounted at any other location along the housing 106. Moreover, the lubrication system 122 additionally or alternatively can be mounted to another portion of the frac pump 100 (e.g., a housing of the fluid end portion 104, a housing of a gearbox (not shown) of the frac pump 100, etc.).

Referring now to FIG. 3, in some examples the lubrication system 122 is contained within the housing 106 of the power end portion 102 of the frac pump 100. More particularly, in the embodiment of FIG. 3, the housing 124 of the lubrication system 122 is held within the housing 106 of the power end portion 102 such that the lubricant tank 126, the pump 128, the heating device 130, the cooling device 132, the filtration device 134, and the control system 136 of the lubrication system 122 are contained within the housing 106 of the power end portion 102. As can be seen in FIG. 3, the outlet 148 of the lubrication system 122 is fluidly connected to the inlet 118 of the lubricant circuit 114 of the power end portion 102, and the inlet 146 of the lubrication system 122 is fluidly connected to the outlet 120 of the lubricant circuit 114 of the power end portion 102. Accordingly, the lubrication system 122 is operatively connected to the lubricant circuit 114 of the power end portion 102 for supplying the lubricant circuit 114 with lubricant during operation of the frac pump 100.

In some other examples of the embodiment shown in FIG. 3 wherein the housing 124 of the lubrication system 122 is held within the housing 106 of the power end portion 102, one or more components (e.g., the control system 136, etc.) of the lubrication system 122 is mounted to an exterior of the housing 106 or otherwise mounted outside of the interior of the housing 106 (e.g., mounted to another portion of the frac pump, mounted to a platform on which the frac pump 100 is held, mounted to another structure adjacent the frac pump, etc.).

In the embodiment shown in FIG. 3, the inlet 146 and the outlet 148 of the lubrication system 122 are permanently connected in fluid communication with the respective outlet 120 and inlet 118 of the lubricant circuit 114 of the power end portion 102. In other examples, the inlet 146 and the outlet 148 of the lubrication system 122 are removably connected in fluid communication with the respective outlet 120 and inlet 118 of the lubricant circuit 114 of the power end portion 102.

Figure 4:
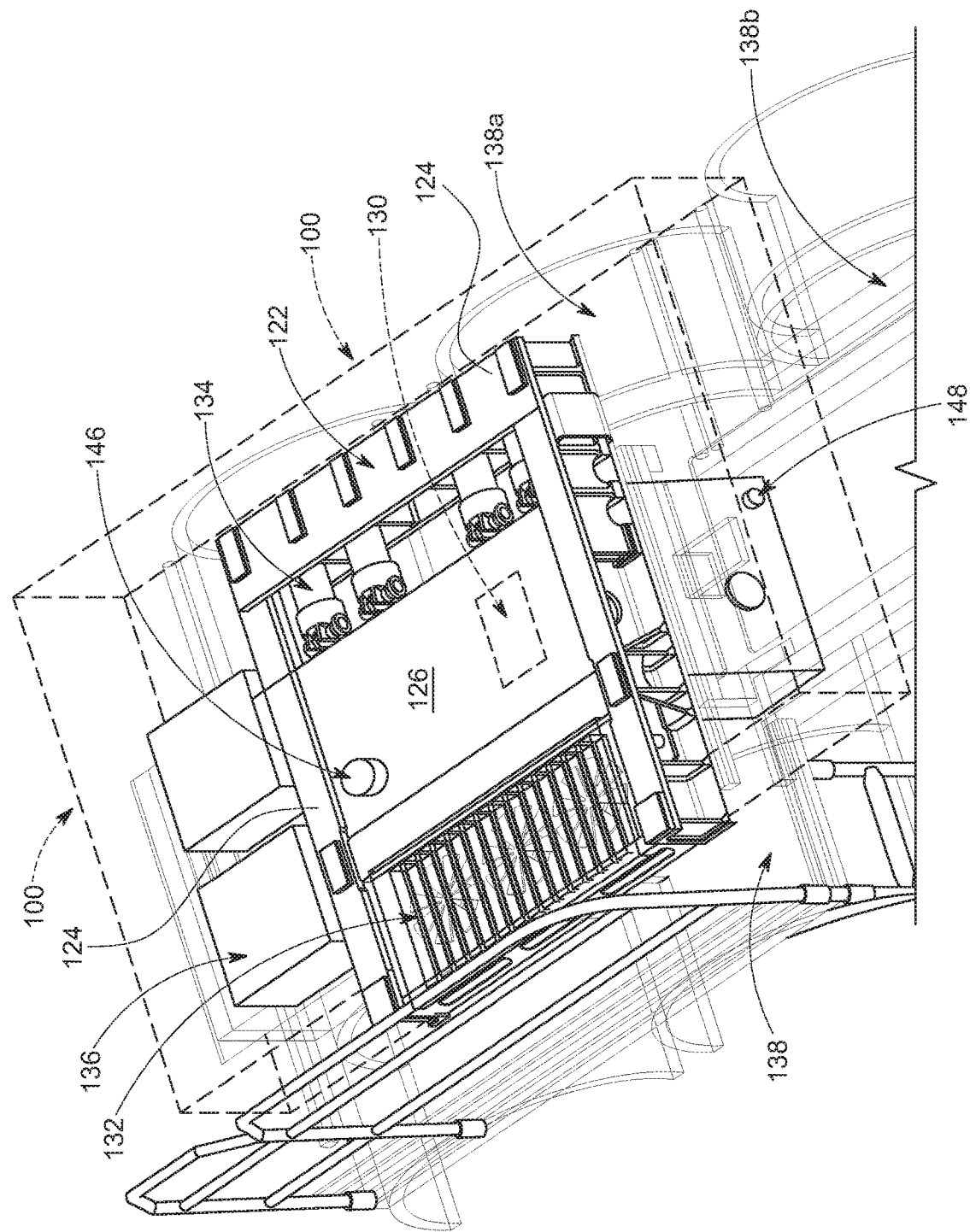
FIG. 4 is a perspective view of a platform for a frac pump and the lubrication system shown in FIG. 2 according to an exemplary embodiment.

Referring now to FIG. 4, in some examples the lubrication system 122 is mounted on a platform 138 that holds the frac pump 100. The frac pump 100 is shown only as a phantom box in FIG. 4 for clarity. More particularly, the embodiment shown in FIG. 4 illustrates the housing 124 of the lubrication system 122 mounted on the platform 138 such that the lubricant tank 126, the pump 128, the heating device 130, the cooling device 132, the filtration device 134, and the control system 136 are held on the platform 138. The outlet 148 of the lubrication system 122 is fluidly connected to the inlet 118 (FIGS. 1 and 3) of the lubricant circuit 114 (FIGS. 1 and 3) of the power end portion 102 (FIGS. 1 and 3) of the frac pump 100. The inlet 146 of the lubrication system 122 is fluidly connected to the outlet 120 (FIGS. 1 and 3) of the lubricant circuit 114 of the power end portion 102. Accordingly, the lubrication system 122 is operatively connected to the lubricant circuit 114 of the power end portion 102 for supplying the lubricant circuit 114 with lubricant during operation of the frac pump 100.

The inlet 146 and the outlet 148 of the lubrication system 122 can be permanently connected in fluid communication with the respective outlet 120 and inlet 118 of the lubricant circuit 114 of the power end portion 102. In other examples, the inlet 146 and the outlet 148 of the lubrication system 122 are removably connected in fluid communication with the respective outlet 120 and inlet 118 of the lubricant circuit 114 of the power end portion 102.

In the exemplary embodiment shown in FIG. 4, the housing 124 of the lubrication system 122 is mounted on the platform 138 underneath the frac pump 100 such that the various components 126, 128, 130, 132, 134, and 136 of the lubrication system 122 are held on the platform 138 underneath the frac pump 100. But, one or more components 126, 128, 130, 132, 134, and/or 136 may be held on the platform at another location (e.g., adjacent the frac pump 100, etc.). In some other examples, the housing 124 of the lubrication system 122 is mounted on the platform 138 at another location besides underneath the frac pump 100 (e.g., adjacent the frac pump 100, etc.). In addition to the housing 124 being mounted on the platform 138, the housing 124 and/or the various components 126, 128, 130, 132, 134, and/or 136 of the lubrication system 122 each may or may not be mounted to the frac pump 100.

In the exemplary embodiment of FIG. 4, the platform 138 includes a trailer 138a that holds a fixture 138b thereon. But, in other examples, the fixture 138b can be freestanding (e.g., a skid, etc.) or the trailer 138a does not include the fixture 138b such that the frac pump 100 is held on another structure or directly on the trailer 138a (e.g., on a bed of the trailer, etc.). Moreover, the platform 138 is not limited to the trailer 138a or the fixture 138b. Rather, the platform 138 additionally or alternatively can include any structure that is configured to hold the frac pump 100, for example a manifold, a skid, a frame, another fixture, another structure, and/or the like.

Figure 5:
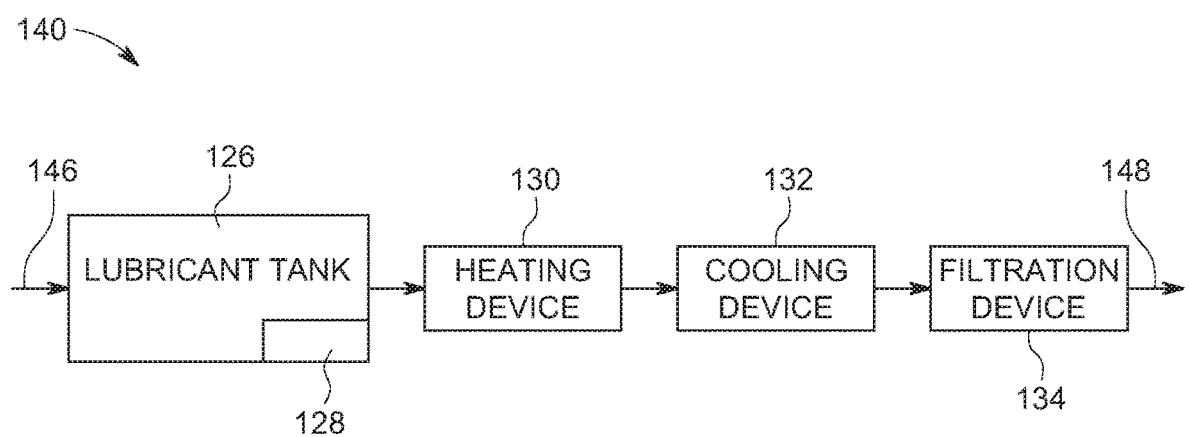
FIG. 5 is a schematic diagram illustrating a circuit of the lubrication system shown in FIG. 2 according to an exemplary embodiment.

Referring again to FIG. 2, the inlet 146 of the lubrication system 122 is located along an upper portion 150 of the lubricant tank 126 and the outlet 148 of the lubrication system 122 is located along a lower portion 152 of the lubricant tank 126 in the exemplary embodiment shown in FIG. 2. But, the inlet 146 and outlet 148 can each have any other location along the lubricant tank 122 and any other location (than the lubricant tank 126 within the circuit(s) of the lubrication system 122. For example, the inlet 146 could be located within the heating device 130, the cooling device 132, or the filtration device 134. Another example includes an inlet 146 directly into a pump 128 (whether the pump 128 is contained within the lubricant tank 126). Moreover, and for example, the outlet 148 could be located within the heating device 130, the cooling device 132, or the filtration device 134 (e.g., as is shown in FIG. 5). Another example includes an outlet 148 directly out of a pump 128 that is not contained within the lubricant tank 126.

Although only one is shown herein, the lubrication system 122 may include any number of the pumps 128, each of which may have any location within the circuit(s) of the lubrication system 122, within the various components of the lubrication system 122, and/or within the lubricant circuit 114 of the frac pump 100 that enables the lubrication system 122 to function as described and/or illustrated herein. In the exemplary embodiment of FIG. 2, the lubrication system 122 is shown as including a single pump 128 that is located (i.e., contained) within the lubricant tank 126. In addition or alternatively to a single pump 128 contained within the lubricant tank 126, other examples include one or more pumps 128 located within the lubricant circuit 114 of the frac pump 100 (e.g., a scavenging pump, etc.), one or more pumps 128 held directly by the housing 124 outside of the lubricant tank 126 and the components 130, 132, and 134 of the lubrication system 122, one or more pumps 128 located within another component (e.g., the heating device 130, the cooling device 132, the filtration device 134, etc.) of the lubrication system 122, and/or the like. In some examples, the lubrication system 122 includes one or more pumps 128 dedicated to one or more of the components 126, 130, 132, and/or 134 of the lubrication system 122. In embodiments wherein a pump 128 is located within the lubricant tank 126, the pump 128 can be fluidly connected to the lubricant tank 126 by being held within a chamber of the lubricant tank 126 that holds lubricant such that the pump 128 is configured to be immersed within the lubricant, by being fluidly connected to the chamber by a fluid circuit inside the lubricant tank 126, and/or the like.

Figure 6:
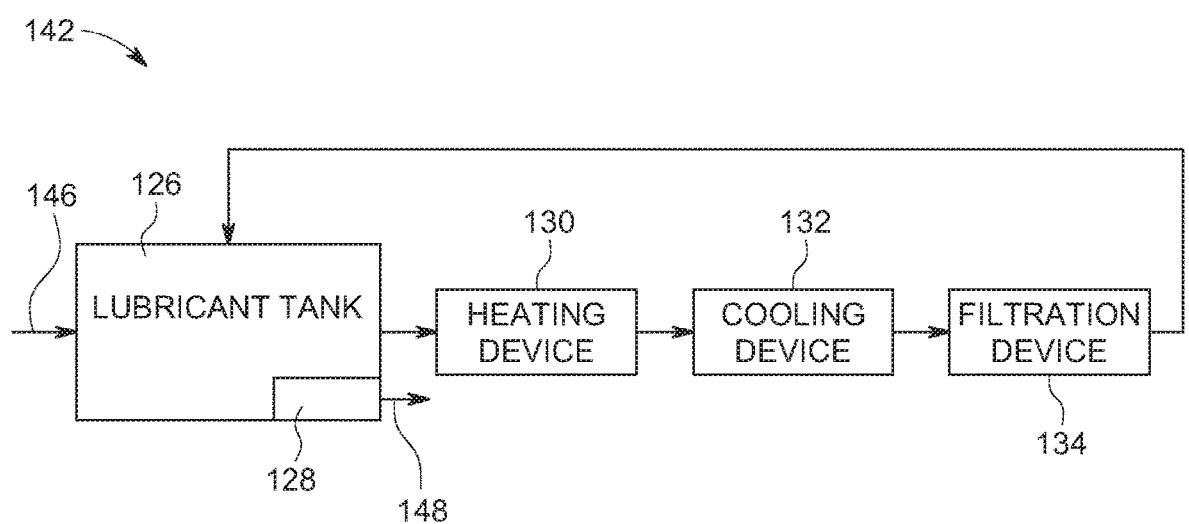
FIG. 6 is a schematic diagram illustrating another circuit of the lubrication system shown in FIG. 2 according to an exemplary embodiment.
Figure 7:
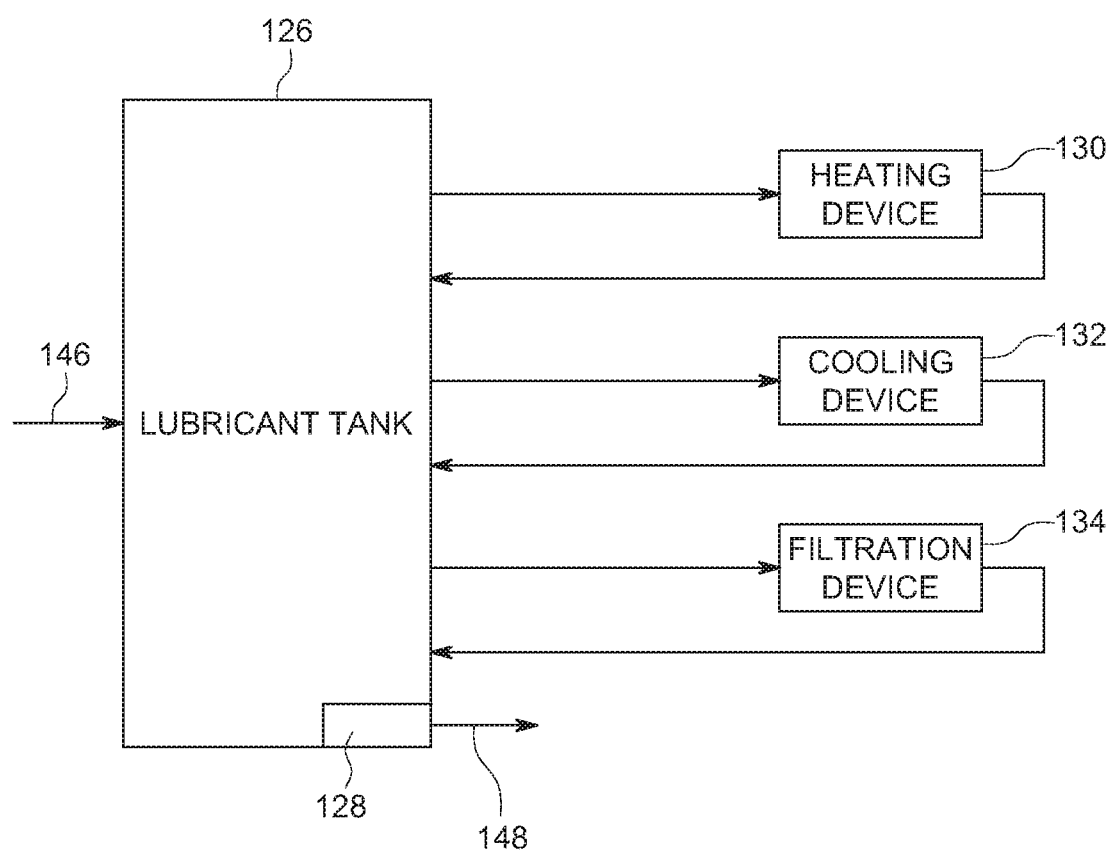
FIG. 7 is a schematic diagram illustrating yet another circuit of the lubrication system shown in FIG. 2 according to an exemplary embodiment.

Although shown in FIG. 2 as being located (i.e., contained) within the lubricant tank 126, the heating device 130 may have any other location within the circuit(s) of the lubrication system 122 that enables the lubrication system 122 to function as described and/or illustrated herein. For example, the heating device 130 may be held directly by the housing 124 outside of the lubricant tank 126 (e.g., as is shown in FIGS. 5-7). The lubrication system 122 can include any number of the heating devices 130. Similarly, although shown as being held directly by the housing 124 outside of the lubricant tank 126, the cooling device 130 and the filtration device 134 can each have any location within the circuit(s) of the lubrication system 122 (e.g., within the lubricant tank 126, etc.) that enables the lubrication system 122 to function as described and/or illustrated herein. In embodiments wherein a heating device 130, a cooling device 132, and/or a filtration device 134 is located within the lubricant tank 126, the heating device 130, the cooling device 132, and/or the filtration device 134 can be fluidly connected to the lubricant tank 126 by being held within a chamber of the lubricant tank 126 that holds lubricant (i.e., immersed within lubricant), by being fluidly connected to the chamber by a fluid circuit inside the lubricant tank 126, and/or the like. The lubrication system 122 can include any number of the cooling devices 132 and any number of the filtration devices 134.

FIG. 5 is a schematic diagram illustrating a circuit 140 of the lubrication system 122 according to an exemplary embodiment. The circuit 140 includes the inlet 146, which feeds lubricant received from the outlet 120 (FIGS. 1 and 3) of the lubricant circuit 114 (FIGS. 1 and 3) of the frac pump 100 (FIGS. 1 and 3) into the lubricant tank 126. For example, a suction side of the pump 128 may pull lubricant from the lubrication circuit 114 of the frac pump 100 into the lubrication tank 126 through the inlet 146. Another example includes a scavenging pump 128 within the lubrication circuit 114 (e.g., within a pan (not shown) of the power end portion 102 (FIGS. 1 and 3) of the frac pump 100) that pushes lubricant through the inlet 146 into the lubricant tank 126.

From the lubricant tank 126, the circuit 140 feeds the lubricant to the heating device 130. For example, a pressure side of the pump 128 may push lubricant from the lubricant tank 126 into the heating device 130. Another example includes a pump 128 that is fluidly connected within the circuit 140 between the lubricant tank 126 and the heating device 130 that pulls the lubricant from the tank and pushes the lubricant into the heating device 130. From the heating device 130, the circuit 140 feeds the lubricant to the cooling device 132 and further downstream to the filtration device 134. From the filtration device 134, the circuit 140 feeds the lubricant through the outlet 148 and into the lubrication circuit 114 of the frac pump 100 through the inlet 118 thereof.

In some circumstances wherein the lubricant is approximately at or above the desired operating temperature of the lubricant, the heating device 130 is not activated to heat the lubricant during operation of the lubrication system 122 (i.e., as the lubricant flows within the circuit 140 through the heating device 130). Similarly, the cooling device 132 may not be activated to cool the lubricant during operation of the lubrication system 122 (i.e., as the lubricant flows within the circuit 140 through the cooling device 132) in circumstances wherein the lubricant is approximately at or below the desired operating temperature of the lubricant.

FIG. 5 illustrates an embodiment wherein the lubrication system 122 includes a single circuit 140 that can be considered to define a kidney loop of the lubricant circuit 114 of the power end 102 of the frac pump 100. More particularly, the circuit 140 can be considered a separate self-contained circuit (i.e., loop) that conditions (e.g., heats, cools, and/or filters, etc.) lubricant from the lubricant circuit 114 of the power end portion 102 of the frac pump 100.

The circuit 140 shown in FIG. 5 is meant as exemplary only. The components 126, 128, 130, 132, and 134 of the lubrication system 122 may have any relative arrangement in any number of circuits. Other exemplary circuits of the lubrication system 122 are described below with reference to FIGS. 6 and 7. Moreover, the lubricant tank 126, the pump 128, the heating device 130, the cooling device 132, and the filtration device 134 of the circuit 140 are not limited to the relative arrangement shown in FIG. 5. Rather, the circuit 140 may include any other relative arrangement of the lubricant tank 126, the pump 128, the heating device 130, the cooling device 132, and the filtration device 124. In other words, each component 126, 128, 130, 132, and 134 may have any other position along the stream of the circuit 140. For example, the cooling device 132 may be located directly downstream from the lubricant tank 126 and directly upstream from the heating device 130 in other examples. Another example includes positioning the filtration device 134 directly downstream from the lubricant tank 126 and directly upstream from the heating device 130. Yet another example includes positioning the filtration device 134 along the stream of the circuit 140 between the heating device 130 and the cooling device 132. Moreover, in some other examples of the circuit 140, the heating device 130, the cooling device 132, and/or the filtration device 134 is located within the lubricant tank 126.

FIG. 6 is a schematic diagram illustrating another circuit 142 of the lubrication system 122 according to an exemplary embodiment. The circuit 142 includes the inlet 146, which feeds lubricant received from the outlet 120 (FIGS. 1 and 3) of the lubricant circuit 114 (FIGS. 1 and 3) of the frac pump 100 (FIGS. 1 and 3) into the lubricant tank 126. From the lubricant tank 126, the circuit 142 feeds the lubricant through the heating device 130 and further downstream through the cooling device 132 and the filtration device 134. From the filtration device 134, the circuit 142 feeds the lubricant back into the lubricant tank 126 and through the outlet 148 into the lubrication circuit 114 of the frac pump 100. The lubricant tank 126 may include suitable dividers, baffles, valves, gates, flow restrictors, and/or the like (not shown) that: (1) separate the upstream flow of lubricant entering the lubricant tank 126 from the inlet 146 from the downstream flow of lubricant reentering the lubricant tank 126 from the filtration device 134; and (2) distribute the upstream and downstream lubricant flows into the heating device 130 and through the outlet 148, respectively.

FIG. 6 illustrates another embodiment wherein the lubrication system 122 includes a single circuit 142 that can be considered to define a kidney loop of the lubricant circuit 114 of the power end 102 of the frac pump 100. For example, the circuit 142 can be considered a separate self-contained circuit (i.e., loop) that conditions (e.g., heats, cools, and/or filters, etc.) lubricant from the lubricant circuit 114 of the power end portion 102 of the frac pump 100.

As with the circuit 140 shown in FIG. 5, the heating device 130 may not be activated to heat the lubricant during operation of the circuit 142 of the lubrication system 122 in circumstances wherein the lubricant is approximately at or above the desired operating temperature of the lubricant. Similarly, the cooling device 132 may not be activated to cool the lubricant during operation of the circuit 142 of the lubrication system 122 in circumstances wherein the lubricant is approximately at or below the desired operating temperature of the lubricant.

The lubricant tank 126, the pump 128, the heating device 130, the cooling device 132, and the filtration device 134 of the circuit 142 are not limited to the relative arrangement shown in FIG. 6. Rather, the circuit 142 may include any other relative arrangement of the lubricant tank 126, the pump 128, the heating device 130, the cooling device 132, and the filtration device 124. In some other examples of the circuit 142, the heating device 130, the cooling device 132, and/or the filtration device 134 is located within the lubricant tank 126.

FIG. 7 is a schematic diagram illustrating another circuit 144 of the lubrication system 122 according to an exemplary embodiment. The circuit 144 includes the inlet 146, which feeds lubricant received from the outlet 120 (FIGS. 1 and 3) of the lubricant circuit 114 (FIGS. 1 and 3) of the frac pump 100 (FIGS. 1 and 3) into the lubricant tank 126. From the lubricant tank 126, the circuit 142 includes three circuits 144a, 144b, and 144c. The circuit 144a feeds the lubricant from the lubricant tank 126 through the heating device 130 and back into the lubricant tank 126. The circuit 144b feeds the lubricant from the lubricant tank 126 through the cooling device 132 and back into the lubricant tank 126. The circuit 144c feeds the lubricant from the lubricant tank 126 through the filtration device 134 and back into the lubricant tank 126. Lubricant returned to the lubricant tank 126 from the circuits 144a, 144b, and 144c is delivered into the inlet 118 (FIGS. 1 and 3) of the lubricant circuit 114 of the power end portion 102 (FIGS. 1 and 3) through the outlet 148.

FIG. 7 illustrates an embodiment wherein the lubrication system 122 includes three circuits 144a, 144b, and 144c that can each be considered to define a kidney loop of the circuit 144. The circuit 144 thus enables the lubrication system 122 to selectively condition the lubricant contained within the lubricant tank 126 using the heating device 130, the cooling device 132, and the filtration device 134. The lubricant tank 126 may include suitable dividers, baffles, valves, gates, flow restrictors, and/or the like (not shown) that separate and distribute the lubricant flows of the three circuits 144a, 144b, and 144c. In some examples, the lubrication system 122 includes one or more dedicated pumps 128 for the circuits 144a, 144b, and/or 144c. In some other examples of the circuit 144, the heating device 130, the cooling device 132, and/or the filtration device 134 is located within the lubricant tank 126.

Referring again to FIG. 2, the lubricant tank 126 can have any capacity. In some examples, the capacity of the lubricant tank 126 is less than approximately 100 gallons. The capacity of the lubricant tank 126 can be selected to reduce the footprint of the lubrication system 122, for example to enable the lubrication system 122 to fit within the envelope of a platform (e.g., the platform 138 shown in FIG. 4) on which the frac pump 100 is held. As described above, the lubricant tank 126 can include one or more suitable dividers, baffles, valves, gates, flow restrictors, and/or the like. Baffles provided within the lubricant tank 126 can reduce flow velocities, facilitate separation of contaminants, prevent cavitation of the lubricant, and/or the like.

The pump(s) 128 of the lubrication system can include any type of pump, such as, but not limited to, hydraulic pumps, mechanical pumps, electric pumps, and/or the like. Each of the pumps 128 of the lubrication system 122 can be driven by any suitable power source, for example electricity, hydraulics, an engine, an electric motor, via the frac pump 100 (e.g., using a belt, chain, pulley, other linkage, and/or the like), and/or the like.

The heating device 130 can include any type of heating device, for example heat exchangers, resistive heaters, positive temperature coefficient (PTC) heaters, and/or the like. The heating device 130 can be integrated into or located relatively near a pump 128, for example to reduce the distance traveled by lubricant within the lubrication system 122, reduce the size of the heating device 130 and/or the lubrication system 122, and/or the like. The number of turns of the heating device 130 can be selected (e.g., increased, etc.) to increase the working hours, increase production, reduce the size of the heating device 130 and/or the lubrication system 122, and/or the like. The location of the heating device 130 within the lubrication system 122 can be selected to reduce the footprint of the lubrication system 122 (e.g., positioning the heating device 130 within the lubricant tank 126 as is shown in FIG. 2), for example to enable the lubrication system 122 to fit within the envelope of a platform on which the frac pump 100 is held.

The cooling device 132 can include any type of cooling device, for example heat exchangers, solid state cooling devices, forced air cooled heat exchangers, cooling fans, and/or the like. The cooling device 132 can be integrated into or located relatively near a pump 128, for example to reduce the distance traveled by lubricant within the lubrication system 122, reduce the size of the cooling device 132 and/or the lubrication system 122, and/or the like. The number of turns of the cooling device 132 can be selected (e.g., increased, etc.) to increase the working hours, increase production, reduce the size of the cooling device 132 and/or the lubrication system 122, and/or the like. The location of the cooling device 132 within the lubrication system 122 can be selected to reduce the footprint of the lubrication system 122 (e.g., positioning the cooling device 132 within the lubricant tank 126), for example to enable the lubrication system 122 to fit within the envelope of a platform on which the frac pump 100 is held.

The filtration device 134 can include any type of filtration device, for example inline filters, screen filters, mesh filters, fabric filters, self-cleaning filters, and/or the like. The filtration device 134 can be integrated into or located relatively near a pump 128, for example to reduce the distance traveled by lubricant within the lubrication system 122, reduce the size of the filtration device 132 and/or the lubrication system 122, and/or the like. The location of the filtration device 134 within the lubrication system 122 can be selected to reduce the footprint of the lubrication system 122 (e.g., positioning the filtration device 134 within the lubricant tank 126), for example to enable the lubrication system 122 to fit within the envelope of a platform on which the frac pump 100 is held.

The control system 136 can include and/or be operatively connected to various sensors (not shown, e.g., temperature sensors, pressure sensors, lubricant level detection sensors, flow rate sensors, etc.) of the lubrication system 122, one or more actuators (not shown), feedback signals (e.g., feedback loops, negative feedback loops, etc.), and/or the like that enable the control system 136 to monitor and control the lubrication system 122, for example as described above. In some examples, the control system 136 is operatively connected to one or more components of the frac pump 100 (e.g., a sensor indicative of an operational state, health, and/or the like of the frac pump 100, a sensor indicative of a parameter of the lubricant currently within the lubricant circuit 114, etc.) and/or one or more components of a hydraulic fracturing system (e.g., a blender, a base control system, a missile, a seismic sensor, another geological sensor, etc.) that includes the frac pump 100. The control system 136 can include and/or be operatively connected to one or more global positioning sensors (GPS) and/or one or more environmental sensors (not shown), for example to enable the control system 136 to determine whether to the lubricant needs to be heated or cooled. Moreover, in some examples the control system 136 can communicate with a base control system (not shown) of a hydraulic fracturing system that includes the frac pump, is networked over a local area network (LAN), is networked over a wide area network (WAN), is networked over a wireless (i.e., Wi-Fi) network, and/or the like.

The control system 136 can include one or more processors (not shown) which can be microprocessors, controllers, and/or any other suitable type of processor for processing computer executable instructions to perform the functions of the control system 136. Computer executable instructions may be provided using any computer-readable media that are accessible by the control system 126. Computer-readable media can include, for example, computer storage media (e.g., a memory, etc.), communications media, and/or the like. Computer storage media can include, but is not limited to, volatile and non-volatile, removable and non-removable media, and/or the like implemented in any method or technology for storage of information, such as, but not limited to, computer readable instructions, data structures, program modules, and/or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, and/or any other non-transmission medium that can be used to store information for access by a computing apparatus. Communication media may embody, but is not limited to, computer readable instructions, data structures, program modules, and/or the like in a modulated data signal, for example a carrier wave and/or other transport mechanism. Although the control system 126 can include computer storage medium, it will be appreciated by a person skilled in the art that storage may be distributed and/or located remotely and accessed via a network and/or other communication link.

The control system 136 can include an input/output controller (not shown) configured to output information to one or more output devices, for example a display, speaker, and/or the like, which may be separate from or integral to the control system 136. The input/output controller can also be configured to receive and process an input from one or more input devices (not shown), for example, a keyboard, a microphone, a touchpad, a mouse, and/or the like. In some examples, the output device also acts as the input device (e.g., a touch sensitive display, etc.). The input/output controller can also output data to devices other than the output device, for example a locally connected printing device, and/or the like. In some examples, a user may provide input to the input device and/or receive output from the output device.

The functionality of the control system 136 can be performed, at least in part, by one or more hardware logic components. According to an embodiment, the control system 136 is configured by program code when executed by a processor to execute the operations, functionality, and/or the like of the control system 136. Alternatively, or in addition, operations, functionality, and/or the like of the control system 136 can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

As apparent from the embodiments described and/or illustrated herein, the lubrication system 122 is a stand-alone lubrication system that can be integrated into a frac pump and/or a platform that holds a frac pump. The lubrication system 122 can provide independent and sustainable devices and systems that do not depend on frac truck infrastructure for support and/or that ease installation (e.g., do not require assembly, for example by a frac truck integrator, etc.). The lubrication system 122 described and/or illustrated herein thus can provide a lubrication system that integrates all lubrication-related components, functions, and control systems (e.g., filtration, heating, cooling, smart controls, etc.) as part of the frac pump system to create a closed-loop device that is capable of standing-alone independent of a frac truck infrastructure. The lubrication system 122 described and/or illustrated herein can protect and increase the operational life of a frac pump life, reduce the total cost of ownership of a frac pump (e.g., by controlling the oil quality, temperature, and start/stop operations of a lubrication system for a frac pump), and/or reduce the effective foot print of the lubrication system and thereby reduce the size of a frac pump system.

The following clauses describe further aspects of the disclosure:

Clause Set A:

A1. A lubrication system for a frac pump, said lubrication system comprising:

a lubrication system housing;

a lubricant tank held by the lubrication system housing and configured to hold a lubricant;

a heating device held by the lubrication system housing, the heating device being fluidly connected to the lubricant tank such that the heating device is configured to heat the lubricant;

a cooling device held by the lubrication system housing, the cooling device being fluidly connected to the lubricant tank such that the cooling device is configured to cool the lubricant;

a filtration device held by the lubrication system housing, the filtration device being fluidly connected to the lubricant tank such that the filtration device is configured to filter the lubricant; and wherein the lubrication system housing is configured to be at least one of mounted to a frac pump housing of the frac pump or held within the frac pump housing.

A2. The lubrication system of clause A1, wherein the lubrication system housing, the lubricant tank, the heating device, the cooling device, and the filtration device are contained within the frac pump housing.

A3. The lubrication system of clause A1, wherein the lubrication system housing is mounted to an exterior of the frac pump housing such that the lubricant tank, the heating device, the cooling device, and the filtration device are held on the exterior of the frac pump housing.

A4. The lubrication system of clause A1, wherein the frac pump is configured to be held by a frac pump platform, the lubrication system housing being mounted to the frac pump housing such that the lubricant tank, the heating device, the cooling device, and the filtration device are held on the frac pump platform underneath the frac pump.

A5. The lubrication system of clause A1, further comprising a lubricant pump configured to move lubricant between the lubricant tank, the heating device, the cooling device, the filtration device, and the frac pump.

A6. The lubrication system of clause A1, further comprising a control system configured to monitor and control at least one of a temperature of the lubricant, a pressure of the lubricant, a quality of the lubricant, a flow rate of the lubricant, or operation of a pump of the lubrication system.

A7. The lubrication system of clause A1, wherein the lubricant tank comprises an outlet fluidly connected to a lubricant circuit of the frac pump and configured to deliver a flow lubricant to the lubricant circuit, the lubricant tank comprising an inlet fluidly connected to the lubricant circuit and configured to receive a flow of the lubricant from the lubricant circuit.

A8. The lubrication system of clause A1, wherein the heating device is at least partially contained within the lubricant tank.

Clause Set B:

B1. A frac pump comprising:
a fluid end;
a power end operatively connected to the fluid end, the power end comprising a power end housing; and
a lubrication system fluidly connected to the power end for delivering a lubricant to the power end, the lubrication system comprising a lubrication system housing and a lubricant tank held by the lubrication system housing, the lubrication system comprising a heating device held by the lubrication system housing and configured to heat the lubricant, the lubrication system comprising a cooling device held by the lubrication system housing and configured to cool the lubricant, the lubrication system comprising a filtration device held by the lubrication system housing and configured to filter the lubricant, wherein the lubrication system housing is at least one of mounted to the power end housing of the frac pump or held within the power end housing.

B2. The frac pump of clause B1, wherein the lubrication system housing, the lubricant tank, the heating device, the cooling device, and the filtration device are contained within the power end housing.

B3. The frac pump of clause B1, wherein the lubrication system housing is mounted to an exterior of the power end housing such that the lubricant tank, the heating device, the cooling device, and the filtration device are held on the exterior of the power end housing.

B4. The frac pump of clause B1, wherein the frac pump is configured to be held by a frac pump platform, the lubrication system housing being at least one of mounted to the power end housing of the frac pump or held within the power end housing such that the lubricant tank, the heating device, the cooling device, and the filtration device are held on the frac pump platform underneath the frac pump.

B5. The frac pump of clause B1, wherein the lubrication system further comprises a lubricant pump configured to move lubricant between the lubricant tank, the heating device, the cooling device, the filtration device, and the frac pump.

B6. The frac pump of clause B1, wherein the lubrication system further comprises a control system configured to monitor and control at least one of a temperature of the lubricant, a pressure of the lubricant, a quality of the lubricant, a flow rate of the lubricant, or operation of a pump of the lubrication system.

B7. The frac pump of clause B1, wherein the power end comprises a lubricant circuit and the lubricant tank comprises an outlet fluidly connected to the lubricant circuit and configured to deliver a flow lubricant to the lubricant circuit, the lubricant tank comprising an inlet fluidly connected to the lubricant circuit and configured to receive a flow of the lubricant from the lubricant circuit.

B8. The frac pump of clause B1, wherein the heating device of the lubrication system is at least partially contained within the lubricant tank.

Clause Set C:

C1. A frac pump system comprising:
a platform;
a frac pump held on the platform, the frac pump comprising a fluid end and a power end operatively connected to the fluid end; and
a lubrication system fluidly connected to the power end of the frac pump for supplying the power end with a lubricant, the lubrication system comprising a housing, a lubricant tank held by the housing, a heating device held by the housing, a cooling device held by the housing, and a filtration device held by the housing, wherein the housing of the lubrication system is mounted on the platform such that the lubricant tank, the heating device, the cooling device, and the filtration device are held on the platform.

C2. The frac pump system of claim C1, wherein the platform comprises at least one of a skid, a trailer, a fixture, a frame, or a manifold.

C3. The frac pump system of claim C1, wherein the housing of the lubrication system is mounted on the platform such that the lubricant tank, the heating device, the cooling device, and the filtration device are held on the platform underneath the frac pump.

C4. The frac pump system of claim C1, wherein the housing of the lubrication system is at least one of mounted to the frac pump housing or held within the frac pump.

It is to be understood that the above description is intended to be illustrative, and not restrictive. For example, the above-described embodiments (and/or aspects thereof) can be used in combination with each other. Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Further, each independent feature or component of any given assembly can constitute an additional embodiment. In addition, many modifications can be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and right", "front" and "rear", "above" and "below" and the like are used as words of convenience to provide reference points and are not to be construed as limiting terms.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. For example, in this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised", "comprises", "having", "has", "includes", and "including" where they appear. The term "exemplary" is intended to mean "an example of." The phrase "one or more of the following: A, B, and C" means "at least one of A and/or at least one of B and/or at least one of C." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations can be performed in any order, unless otherwise specified, and examples of the disclosure can include additional or fewer operations than those disclosed herein. It is therefore contemplated that executing or performing a particular operation before, contemporaneously with, or after another operation is within the scope of aspects of the disclosure.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A lubrication system for a frac pump, the lubrication system comprising:
    a lubrication system housing,
        wherein the lubrication system housing is free-standing, being supported independently of the frac pump, and configured to be integrated into the frac pump;
    a lubricant tank directly supported on the lubrication system housing and configured to hold a lubricant;
    a heating device supported on the lubrication system housing, the heating device being fluidly connected to the lubricant tank such that the heating device is configured to heat the lubricant;
    a cooling device directly supported on the lubrication system housing, the cooling device being fluidly connected to the lubricant tank such that the cooling device is configured to cool the lubricant; and
    a filtration device directly supported on the lubrication system housing, the filtration device being fluidly connected to the lubricant tank such that the filtration device is configured to filter the lubricant,
        wherein the lubrication system housing, the lubricant tank, the heating device, the cooling device, and the filtration device are contained within a power end housing of the frac pump.

2. The lubrication system of claim 1, further comprising a lubricant pump configured to move lubricant between the lubricant tank, the heating device, the cooling device, the filtration device, and the frac pump.

3. The lubrication system of claim 1, further comprising a control system configured to monitor and control at least one of a temperature of the lubricant, a pressure of the lubricant, a quality of the lubricant, a flow rate of the lubricant, or operation of a pump of the lubrication system.

4. The lubrication system of claim 1, wherein the lubricant tank comprises;
    an outlet fluidly connected to a lubricant circuit of the frac pump and configured to deliver a flow of lubricant to the lubricant circuit, and
    an inlet fluidly connected to the lubricant circuit and configured to receive a flow of the lubricant from the lubricant circuit.

5. The lubrication system of claim 1, wherein the heating device is at least partially contained within the lubricant tank.

6. The lubrication system of claim 1, wherein an inlet of the lubrication system, located in the lubricant tank, extends from inside to outside a plane defined by an outer frame of the lubrication system housing.

7. A frac pump comprising;
    a fluid end including a fluid cylinder;
    a power end operatively connected to the fluid end, the power end comprising a power end housing,
        wherein an interior of the power end housing partly encloses a plunger rod assembly,
        wherein the fluid cylinder is outside the interior of the power end housing, and
        wherein the plunger rod assembly extends outside the interior of the power end housing and into the fluid cylinder to pump fluid through the fluid cylinder; and
    a lubrication system fluidly connected to the power end for delivering lubricant to the power end, the lubrication system comprising:

a lubrication system housing contained within the power end housing, the lubrication system housing enclosing:
a lubricant tank,
a heating device configured to heat the lubricant,
a cooling device configured to cool the lubricant, and
a filtration device configured to filter the lubricant.

8. The frac pump of claim 7, wherein the lubrication system further comprises a lubricant pump configured to move lubricant between the lubricant tank, the heating device, the cooling device, the filtration device, and the frac pump.

9. The frac pump of claim 7, wherein the lubrication system further comprises a control system configured to monitor and control at least one of a temperature of the lubricant, a pressure of the lubricant, a quality of the lubricant, a flow rate of the lubricant, or operation of a pump of the lubrication system.

10. The frac pump of claim 7, wherein the power end comprises a lubricant circuit and the lubricant tank comprises:
an outlet fluidly connected to the lubricant circuit and configured to deliver a flow of lubricant to the lubricant circuit, and
an inlet fluidly connected to the lubricant circuit and configured to receive a flow of the lubricant from the lubricant circuit.

11. The frac pump of claim 7, wherein the heating device of the lubrication system is at least partially contained within the lubricant tank.

12. A frac pump system comprising:
a platform;
a frac pump held on the platform, the frac pump comprising a fluid end and a power end operatively connected to the fluid end,
wherein the power end includes a power end housing having an interior and an exterior, the exterior being mounted on the platform,
wherein the interior of the power end housing encloses a lubricant circuit including:
an inlet;
an outlet; and
a plurality of channels in fluid communication with the inlet and the outlet,
the plurality of channels being configured to distribute lubricant to components of the power end within the interior of the power end housing; and
a lubrication system fluidly connected to the lubricant circuit for supplying the components of the power end with lubricant, the lubrication system comprising:
a housing contained within the interior of the power end housing,
a lubricant tank in the housing,
wherein an inlet of the lubrication system, located in the lubricant tank, extends from inside to outside a plane defined by an outer frame of the housing, and wherein the inlet of the lubrication system is in direct fluid communication with the outlet of the lubricant circuit,
a heating device in the housing,
a cooling device in the housing, and
a filtration device in the housing.

13. The frac pump system of claim 12, wherein the platform comprises at least one of a skid, a trailer, a fixture, a frame, or a manifold.

* * * * *